Jan. 26, 1971   R. H. WRIGHT   3,557,486
FISHING SINKER
Filed May 22, 1968
FIG. 1.
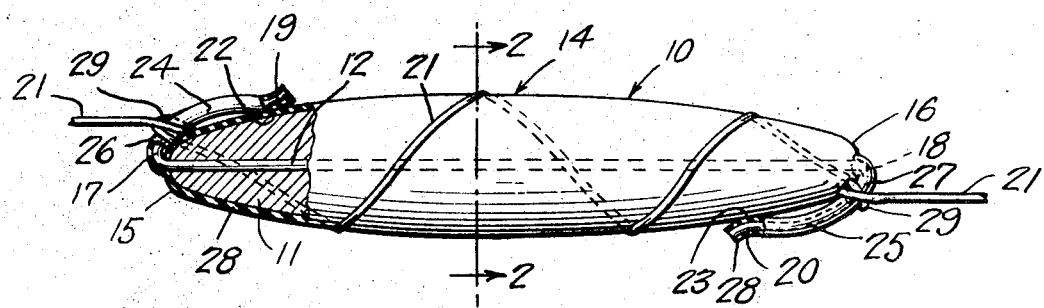
FIG. 2.
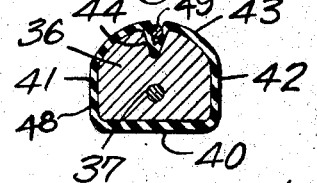
FIG. 3.
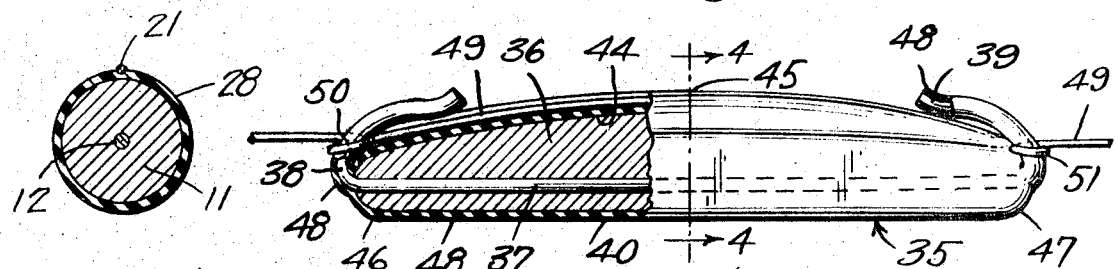
FIG. 4.   FIG. 8.
FIG. 5.
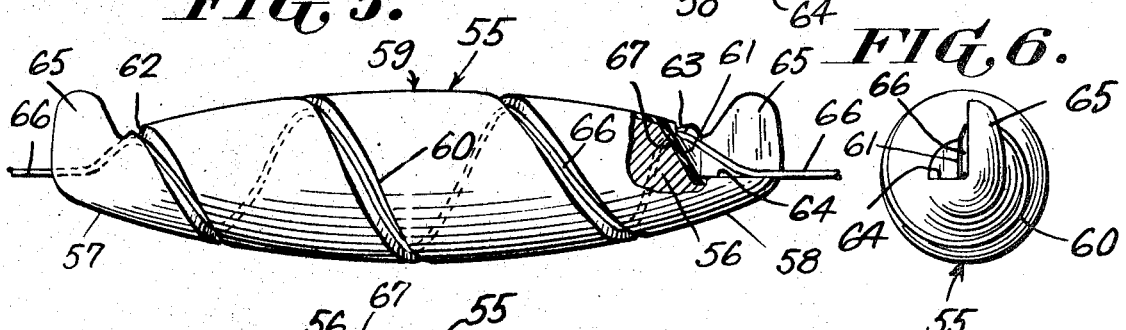
FIG. 6.
FIG. 7.
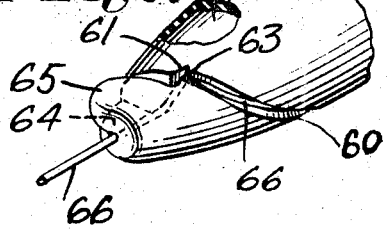
INVENTOR.
Robert H. Wright
BY
Shanley & O'Neil
ATTORNEYS

United States Patent Office 3,557,486
Patented Jan. 26, 1971

3,557,486
FISHING SINKER
Robert H. Wright, 179 Central Ave.,
Long Beach, Miss. 39560
Filed May 22, 1968, Ser. No. 731,066
Int. Cl. A01k 95/00
U.S. Cl. 43—44.89                    10 Claims

ABSTRACT OF THE DISCLOSURE

Improved fishing sinkers including means for attaching a fishing line thereto are provided with an organic coating, which preferably comprises a rubbery material, thereby assuring that the fishing line is not damaged by the sinker and remains attached thereto in a positive manner while fishing.

---

This invention broadly relates to an improved fishing sinker. In one of its more specific embodiments, the invention further relates to a novel fishing sinker, which may be positively attached to monofilament fishing lines, as well as to other types of fishing lines.

A wide variety of fishing sinkers have been provided in the past. While the prior art sinkers have been generally satisfactory in some respects, they have not been entirely satisfactory in all respects and especially when used with monofilament fishing lines. As is well known, monofilament fishing lines are difficult to attach to fishing sinkers in a positive manner, and quite often the sinker body and the fishing line attaching means damage the fine monofilament sufficiently to weaken it.

It is an object of the present invention to provide an improved fishing sinker which, while useful with all types of fishing lines, is especially useful with monofilament fishing lines.

It is a further object to provide a fishing sinker having an organic coating thereon, whereby the fishing line may be securely held and retained in place.

It is still a further object to provide a novel fishing sinker which is covered with an organic coating over substantially its entire surface area, thereby preventing damage to the fishing line by the various elements of the sinker.

Still other objects and advantages of the invention will be apparent to those skilled in the art upon reference to the following description and the drawings, wherein:

FIG. 1 is a side view in elevation of one embodiment of a fishing sinker constructed in accordance with the invention, with a portion thereof being broken away to illustrate the internal construction;

FIG. 2 is a cross sectional view taken along the line 2—2 of FIG. 1;

FIG. 3 is a side view in elevation, with a portion thereof being broken away to illustrate the internal construction of a further embodiment of a fishing sinker constructed in accordance with the invention;

FIG. 4 is a cross sectional view taken along the line 4—4 of FIG. 3;

FIG. 5 is a side view in elevation of a further embodiment of a fishing sinker constructed in accordance with the invention;

FIG. 6 is an end view of the fishing sinker of FIG. 5, illustrating the fin or clamp in the initial open position;

FIG. 7 is an enlarged fragmentary perspective view further illustrating one end of the fishing sinker of FIG. 5, and showing the fin or clamp in the closed position whereby the fishing line is securely retained thereby; and FIG. 8 is an enlarged fragmentary perspective view further illustrating the end of the fishing sinker of FIG. 5 with the fin or clamp in the open position, and the configuration of the V-shaped slit for retaining the fishing line therein.

Referring now to the drawings and more particularly to the embodiment of the fishing sinker of the invention illustrated in FIGS. 1 and 2, the fishing sinker 10 includes a body portion 11 surrounding an elongated member on wire 12. The body portion 11 is elongated and generally circular in cross section, and tapers from a maximum diameter at the point 14 to a minimum diameter at the ends 15 and 16. The wire 12 is centrally located within body 11 and runs the length thereof, and includes ends 17 and 18 which extend past body 11 and are folded back toward point 14 and circumferentially spaced at 180° to each other so as to lie on opposite sides of the body 11.

The ends 17 and 18 include outermost end portions 19 and 20 which are folded outward from body 11 at a substantial angle, whereby the fishing line 21 may be easily inserted thereunder. The ends 17 and 18 are in frictional engagement with the body 11 at points 22 and 23, and then are bent outward from body 11 so as to be spaced therefrom at points 24 and 25, and finally are bent so as to closely conform with the general configuration of the surface of the body 11 at points 26 and 27 near ends 15 and 16.

The surfaces of body 11 and ends 17 and 18 are coated with an organic coating layer 28. Preferably, the coating 28 is sufficiently soft and thick or rubbery to allow the fishing line 21 to be at least partially embedded therein, as illustrated in FIG. 2, when the fishing line 21 is spirally wound as shown in FIG. 1 and tension is applied thereto. The coating 28 is preferably tacky in nature, whereby the fishing line 21 is adhesively retained in the position as illustrated. Additionally, as may be best seen in FIG. 1, the fishing line 21 is positioned between the coatings 28 on the body 11 and end portions 17 and 18 at points 26 and 27, and is tightly held or clamped therebetween and retained by compressive forces which are exerted by ends 17 and 18 in a direction toward the body 11 due to the configuration and spacing. The fishing line 21 may be attached to sinker 10 by means of simple loops 29, which may be embedded in the coating layers 28 and held by frictional forces at points 26 and 27.

A different embodiment of a fishing sinker 35 is illustrated in FIGS. 3 and 4 of the drawings. The fishing sinker 35 likewise includes an elongated body 36 having an elongated member or wire 37 running longitudinally therethrough with external end portions 38 and 39 having general configurations as described above for ends 17 and 18 insofar as their relationship to body 36 is concerned. The body 36 has a flat bottom 40 and sides 41 and 42 which extend upward therefrom initially and then toward each other to form a top portion 43 which is provided with a longitudinally extending V-shaped slot 44. The body 36 has a maximum height at point 45 intermediate the ends 46 and 47, and tapers downwardly therefrom.

The ends 38 and 39 of wire 37 and the entire outer surface of body 36 are provided with an organic coating 48 which is preferably of a rubbery material. The wire ends 38 and 39 are folded over onto body 36 and into the slot 44, thereby allowing the fishing line 49 to run along the entire length of slot 44 and the simple loops 50 and 51 therein to be retained between the coatings 48 on wire ends 38 and 39 and the coating 48 on body 36 in the same manner as described above in connection with FIGS. 1 and 2. For instance, it may be seen in FIG. 4 that the fishing line 49 is partially embedded in the coating 48 as it extends along the slot 44 and, as is illustrated in FIG. 3, the loops 50 and 51 are clamped and securely held between the coating layers on the wire ends 38 and 39 and the body 36.

A further modification of a fishing sinker in accordance with the invention is illustrated in FIGS. 5 through 8 of the drawings. The fishing sinker 55 includes an elongated body 56 which is generally circular in cross section and tapers towards the ends 57 and 58 from a point of maximum diameter 59. The body 56 is provided with a spiral groove 60 which extends substantially the length thereof and terminates at either end 62 and 63 in a V-shaped slot 61. The terminal ends 62 and 63 of groove 60 are on the upper surface of the body 56, and the V-shaped slots 61 extend downward therefrom to the relatively flat horizontally extending shoulders 64 at the bases of fins 65. The fins 65 are arranged so that, when folded onto the fishing line 66 from the position shown in FIG. 5 to the position shown in FIG. 7, additional tension is applied to the fishing line 66 in groove 60. It should also be noted that the shoulders 64 extend substantially along the longitudinal center line of the body 56, and as the fishing line 66 runs therealong, it is apparent that the sinker 55 hangs on the fishing line 66 in the manner of a plumb bob for greater ease of fishing.

The entire surfaces of body 56, groove 60 and fins 65 are provided with an organic coating 67 such as is described for the sinkers 10 and 35. The fishing line 66 preferably is at least partially embedded in and retained by the adhesive properties of the coating 67 in groove 60, and is also clamped between the organic coatings 67 on the surfaces of fins 65 and body 56 when fins 65 are folded thereon such as is illustrated in FIG. 7. Additionally, inasmuch as the slots 61 are V-shaped, fine monofilament fishing lines may be retained therein without substantial longitudinal movement of the sinker 55 along the fishing line 66.

The organic coating applied to the fishing sinkers of the invention may contain a rubbery substance such as, for example, natural rubber, synthetic rubber such as styrene-butadiene, rubbery copolymers, rubbery homopolymers of conjugated diolefins such as high cis-1,4-polybutadiene or high cis-1,4-polyisoprene. Additionally, plastic coatings may be employed, such as polyethylene or polypropylene, polytetrafluoroethylene or other polyhalogenated ethylenes, and the like. In one preferred variant, the coating is formed from a material which is sufficiently rubbery, soft, and/or tacky to cause the fishing line to be at least partially embedded therein and retained thereby. The organic coating is preferably applied to all surfaces of the fishing sinker or component elements thereof which are in contact with the fishing line, thereby assuring that fine relatively fragile monofilaments are securely held in place and are not damaged during normal use due to contact with a roughened surface of the sinker body or clamping between relatively hard surfaces.

The body portions 11, 36 and 56 of the fishing sinkers of the invention may be formed from any suitable metal, including lead, zinc, brass, bronze ferrous metals and alloys such as iron and steel, and the like. The body portions 11, 36 and 56 also may be formed from any suitable water insoluble non-metallic material having a specific gravity substantially greater than 1.0, such as glass, terra cotta, etc. Similarly, the elongated members 12 and 37 may be formed from a metallic material such as those mentioned above for the body portions 11, 36 and 57, or in some instances plastic materials such as Bakelite, polyethylene, polypropylene, etc. However, in one preferred embodiment, the wires 12 and 37 are metallic and should have sufficient hardness and/or strength so that the ends 17 and 18 or 38 and 39, when bent in the manner shown in the drawings, are forced against the body members 11 and 36, respectively, by a spring-like action whereby the portions of the fishing lines between the coated surfaces thereof are clamped and securely held.

As will be recognized by those skilled in the art, the fishing sinker 10 illustrated in FIGS. 1 and 2 may be provided with a longitudinally extending slot such as slot 44 on FIGS. 3 and 4, and/or a spirally extending groove in the manner illustrated for groove 60 of sinker 55 in FIG. 5. When desired, the sinker 55 illustrated in FIGS. 5 through 9 may be provided with a longitudinally extending member such as wires 12 and 37 in the fishing sinkers 10 and 35 and/or a longitudinally extending slot such as slot 44 in FIGS. 3 and 4. The sinker 35 also may be provided with a spiral groove, such as groove 60 in sinker 55.

Fishing lines such as nylon monofilaments may be readily attached to the fishing sinkers of the invention. In attaching the fishing line 21 to the sinker 10, one or more simple loops 29 are formed on the portion 19 and then pulled along the end 17 to the point 26. The fishing line 21 is spirally wound as illustrated in FIG. 1 until the end 18 is reached, and then one or more simple loops 29 are formed on the portion 20 and pulled along the end 18 until the point 27 is reached. At that time, additional tension may be applied to the fishing line 21 so as to set the spiraled portion securely within the coating 28 and the loops 29, between the coatings on the body portion 11 and ends 17 and 18, respectively at points 26 and 27. A nylon monofilament or other fishing line may be easily attached to the sinker 36 in a manner similar to that described above for sinker 10. For instance, one or more simple loops 50 in fishing line 49 are passed over the end 38 and pulled down between the coatings 48 on the end 46 and the end 38, the fishing line 49 is passed along the slot 44 until the end 39 is reached, and then one or more simple loops 51 are formed and passed over the end 39 and pulled down between the coatings 48 on the end 39 and the body 36 in the vicinity of end 47 as illustrated in FIG. 3. Additional tension is then applied to fishing line 49 to set it in coating 48 in slot 44, and between the coatings 48 on ends 38 and 39 and body 36. The fishing line 66 may be attached to the fishing sinker 55 illustrated in FIGS. 5 through 8 by feeding it along the shoulder 64 beneath fin 65 at end 57, and then upward through the V-shaped slot 61 adjacent thereto into the groove 60, followed by bending the fin 65 at end 57 from the position illustrated in FIG. 5 to the position illustrated in FIG. 7, thereby securely clamping the fishing line at end 57 between the organic coatings on fin 65 and shoulder 64. The fishing line 66 is passed along the groove 60 until the slot 61 at end 58 is reached, and then downward along the slot 61 onto the surface 64 at end 58, followed by bending the fin 65 at end 58 from the position illustrated in FIG. 5 to that illustrated in FIG. 7, whereby the fishing line 66 is clamped at end 58 between the coatings 67 on fin 65 and shoulder 64. It is understood that some tension is applied to the fishing line 66 within groove 60 before the fin 65 at end 58 is bent, and that the bending of fin 65 at end 58 also applies additional tension thereto due to the fishing line 66 at end 58 being forced downward from the position shown in FIG. 5 to lie along the shoulder 64, as in FIG. 7. This assures that the fishing line 66 is set in the coating 67 in groove 60, and is retained in place thereby.

The foregoing detailed description and the various views in the drawings are for purposes of illustration only, and are not intended as being limiting to the spirit or scope of the appended claims.

I claim:

1. A fishing sinker comprising a water insoluble body member having a specific gravity greater than 1.0, means carried by the body member for attaching a fishing line thereto, the body member being elongated and the fishing line attaching means including spaced fishing line retaining means adjacent each end thereof, and an adherent coating on substantially the entire surface area of the body member and the fishing line attaching means whereby a fishing line attached to the sinker is in contact therewith, said coating adhering tightly to the body member and having a thickness which is markedly less than the thickness of the body member, said coating having a consistency and thickness whereby the fishing line may be at least partially embedded therein, said coating being a protective coating which protects the body member and the fishing line attaching means, and said spaced fishing line retaining means adjacent each end of the body member including means for securely holding the fishing line between surfaces having the adherent coating thereon whereby the fishing line is held in place and damage thereto is prevented.

2. The fishing sinker of claim 1 wherein the adherent coating comprises a rubber-like material.

3. The fishing sinker of claim 1 wherein the fishing line attaching means includes a wire extending longitudinally through the body member and past the ends thereof to provide end portions, and the end portions of the wire are folded back onto the body member whereby the fishing line may be attached to the folded end portions and held in place between the adherent coating thereon and the adherent coating on the body member.

4. The fishing sinker of claim 3 wherein the body member is formed of a metallic material and has a generally circular transverse cross section and the adherent coating is a rubbery coating covering substantially the entire surface area, the rubbery coating is sufficiently thick and has a consistency whereby the fishing line may be spirally wound around the body portion and at least partially embedded in and retained in place thereby, the wire is formed of a metallic material and the end portions of the wire are folded back onto the body portion at a circumferential spacing of about 180° whereby the folded end portions are on opposite sides of the body member.

5. The fishing sinker of claim 3 wherein the body member is formed of a metallic material and has a V-shaped slot extending longitudinally along substantially the length thereof to receive the fishing line, the slot has an adherent rubbery organic coating therein on the surface area contacted by the fishing line, the rubbery coating having a consistency and thickness whereby the fishing line may be at least partially embedded therein, the outer portion of the coated V-shaped slot has a width greater than the diameter of the fishing line and the inner portion thereof has a width less than the diameter of the fishing line whereby the fishing line may be at least partially embedded therein between adjacent coating layers and retained in place, the wire is formed of a metallic material and the end portions of the wire are folded back onto the body portion and into the ends of the slot.

6. The fishing sinker of claim 1 wherein the body member has at least one V-shaped slot therein to receive the fishing line, the slot has the adherent coating therein on the surface area contacted by the fishing line, and the outer portion of the coated V-shaped slot has a width greater than the diameter of the fishing line and the inner portion thereof has a width less than the diameter of the fishing line whereby the fishing line may be at least partially embedded therein between adjacent coating layers and retained in place.

7. The fishing sinker of claim 1 wherein the body member has a V-shaped groove in the form of a spiral in the surface thereof to receive the fishing line, the groove has the adherent coating therein on the surface area contacted by the fishing line, and the outer portion of the coated V-shaped groove has a width greater than the diameter of the fishing line and the inner portion thereof has a width less than the diameter of the fishing line whereby the fishing line may be at least partially embedded therein between adjacent coating layers and retained in place.

8. The fishing sinker of claim 7 wherein the body member is formed of a metallic material and has a generally circular transverse cross section, the means for attaching the fishing line includes a bendable metallic fin on each end of the body member for clamping the fishing line between the fin and a portion of the body member, the fins are arranged on either side of a vertical plane taken through the longitudinal axis of the body member and are each bendable in a direction toward the vertical plane, a shoulder lying in a horizontal plane taken through the longitudinal axis of the body member is provided at each end thereof for supporting the fishing line, the fins extend upward from the horizontal plane and a shoulder and a fin are located at each end of the body member on opposite sides of the vertical plane whereby the fin may be bent onto the shoulder and the fishing line clamped therebetween, the V-shaped spiral groove terminates at each end in a slot for receiving the fishing line which leads from the groove terminus to the shoulder adjacent thereto whereby the fishing line may be passed from the groove, along the slot and onto the shoulder and thereafter passed away from the sinker, and the surface areas of the groove, slot, shoulders and fins contacted by the fishing line are provided with an adherent rubbery organic coating.

9. The fishing sinker of claim 1 wherein the fishing line attaching means includes at least two spaced attachment members on the body member, the attachment members having portions spaced from said body member and including means for snapping the fishing line into and out of said spaced portions whereby the fishing line may be attached to the body member and thereafter detached.

10. The fishing sinker of claim 9 wherein the spaced attachment members include means whereby a series of loops may be formed in the fishing line and individually snapped into said spaced portions and tautly drawn to thereby attach the fishing line to said body member, and the fishing line may be detached from the body member by reversing the procedure.

References Cited

UNITED STATES PATENTS

| | | | |
|---|---|---|---|
| 418,995 | 1/1890 | Tufts | 43—44.95 |
| 735,235 | 8/1903 | Foust | 43—44.92 |
| 2,077,184 | 4/1937 | Rader et al. | 43—44.87 |
| 2,519,104 | 8/1950 | Blomgren | 43—44.97 |
| 3,367,060 | 2/1968 | Abercrombie | 43—42.33 |

WARNER H. CAMP, Primary Examiner

U.S. Cl. X.R.

43—44.95